Nov. 19, 1968   N. R. M. WEIBULL   3,411,557
APPARATUSES FOR DISPERSION OF SOLID PARTICLES IN LIQUIDS
Filed Oct. 31, 1966
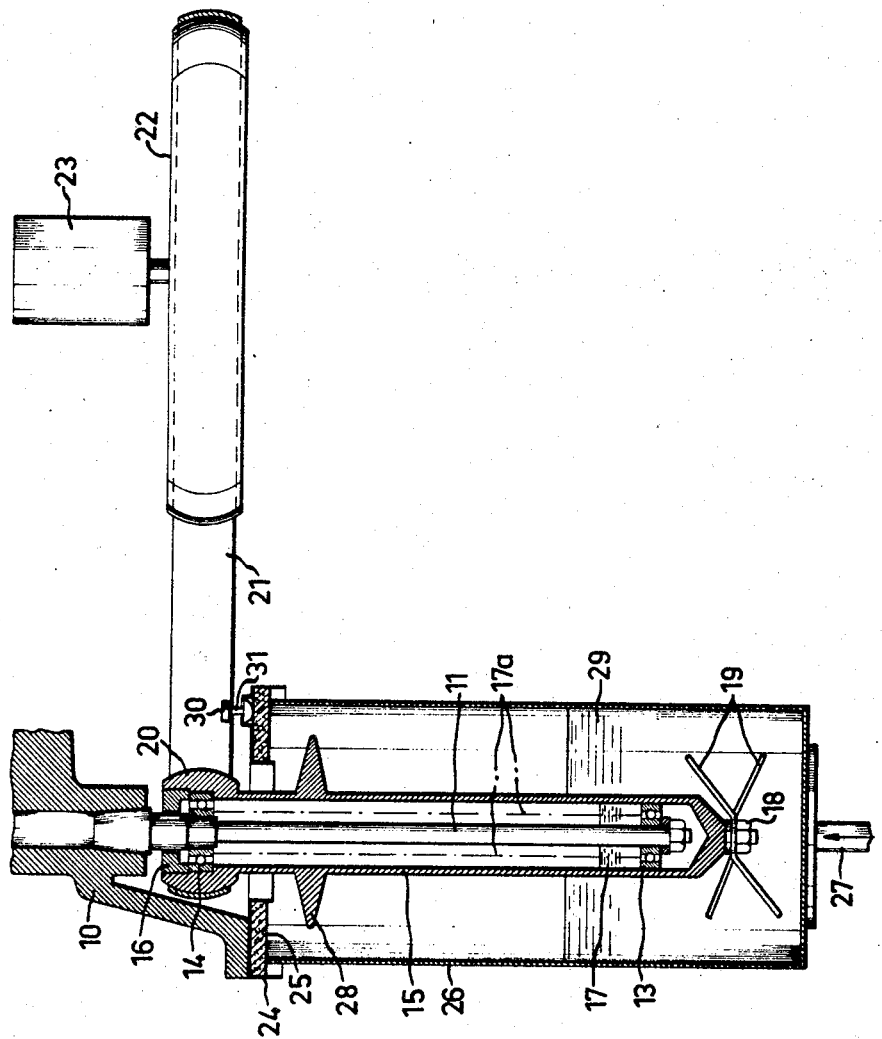

3,411,557
APPARATUSES FOR DISPERSION OF SOLID PARTICLES IN LIQUIDS
Nils R. M. Weibull, Malmo, Sweden, assignor to Ingeniorsfirman Nils Weibull AB, Malmo, Sweden
Filed Oct. 31, 1966, Ser. No. 590,687
5 Claims. (Cl. 146—68)

This invention relates to an apparatus for dispersion of particles in a liquid.

The sugar content of the sugar beets delivered to the sugar factories is one of the basic factors for the calculation of what payment the factory will have to make for the beets delivered, and the sugar content of the beets therefore is usually determined separately for each beet load delivered. In this continuous determination of the sugar content a quantity of beets is taken as a sample of the delivery in such a way that it can be considered representative for the delivered beet load in its entirety, a mash is prepared from said quantity, and a small quantity of the prepared mash is weighed and subjected to further dispersion. This dispersion of the mash can be effected and is at present effected exclusively in mixer type comminuting and dispersing apparatuses.

As is no doubt fully realized, it is imperative that the quantity of mash employed for the determination of the sugar content, which quantity merely is an extremely insignificant portion of the total amount of beets originally taken as a sample, is representative for the sample amount taken and thus for the delivered beet load in its entirety. The apparatuses are at present used for the final dispersion of the mash, but insufficiently satisfy the requirement for a complete dispersion of the mash. To make it possible to have the mash during dispersion in simple vessels which can be readily inserted in turn of order in the apparatus, these prior-art apparatuses comprise a substantially vertical spindle with knives mounted at the lower free end thereof, and the vessels utilized are open top containers which are moved from below up around the spindle against a stationary cover which tightly closes the top end of the container and is traversed by the spindle. At the high speed rotation of the spindle the mash tends to splash in an upward direction along the spindle and to deposit as a cake at the underside of the cover. To ensure a complete fine dispersion of the mash, after the preparation of the mash in the apparatus, the said cake must be removed and the mash in its entirety, i.e. the cake deposited at the cover and the mash left in the vessel, has to be subjected to further dispersion before the required quantity of the liquid in which the mash has been dispersed is taken out for analysis. This implies that the preparations for the analysis will include a further step, which is not compatible with an analyzing procedure to be effected continuously, perhaps automatically for the beet deliveries made during a short but intense sugar beet season.

This invention relates to an apparatus for very fine dispersion of solid particles in a liquid and has been developed particularly in order to satisfy the demand for such an apparatus in the preparation of mash, outlined above, for the determination of the sugar content in sugar beets, but it goes without saying that the apparatus is useful also in other connections where it is desired to realize an effective fine dispersion of solid particles in a liquid.

The apparatus comprises a spindle, means mounting said spindle for rotation in a substantially vertical position, the lower end of said spindle projecting downwardly from said mounting means, a drive gear for rotating said spindle, an open-top container for material to be treated comprising solid particles in a liquid, a cover for said container supported by said mounting and traversed by said spindle which extends downwardly from the lower side of said cover, means for applying said container at its open end against the lower side of said cover with said spindle projecting into the container and having its lower end near the bottom thereof, means on said spindle at the lower end thereof for dispersing said particles in said liquid when said spindle is rotated in said container, and an annular flange on said spindle rotatable therewith, said flange being disposed beneath the lower surface of said cover. Said annular flange will catch the mash splashing against the underside of the cover during the high-speed rotation of the spindle and throw it outwards against the container wall so that it flows down along said wall together with the liquid and unites with the remaining mash in the container. This will entirely prevent the mash from depositing at the cover.

For better elucidation of the invention an apparatus constructed in accordance with the invention will be described in the following, reference being had to the accompanying drawing illustrating the apparatus in vertical section.

The apparatus illustrated in the drawing comprises a frame 10 which may be of conventional construction to permit mounting or placing on a table or mounting on a wall, or the frame may be part of analyzing equipment; therefore the frame is but fragmentarily shown. Its particular shape is conformed to the circumstances prevailing in the individual case. A stationary shaft 11 is secured in the frame and freely extends from it substantially in a vertical downward direction. Mounted for rotation on this shaft by means of a lower ball bearing 13 and an upper ball bearing 14 is a spindle 15 which is in the form of a sleeve which is closed at the lower end and has an annular nut 16 surrounding the shaft screwed into the upper end. The sleeve contains an amount of oil as is indicated at 17. At the lower end of the sleeve is mounted a pair of knives 19 which are exchangeable by reason of the screw connection 18. At the upper end the sleeve is formed on the outer side thereof as a pulley 20. A belt 21 is placed around said pulley 20 and also around a considerably larger pulley 22 of great mass driven by a motor 23 which can be carried by the frame 10 in a suitable manner (not shown).

The frame 10 further has fixedly mounted thereon a cover 24 which is equipped with a packing 25 at the underside. An open-top cylindrical container 26 is engageable with its rim against the underside of the packing with the aid of a plunger 27 which can be operated either manually or mechanically. An annular flange 28 of peripherally tapering thickness is disposed on the outer side of the spindle 15 a short distance beneath the underside of the cover.

In the use of the apparatus the container 26 with the material to be dispersed, for example a mash of root crops indicated at 29, is placed in application with the packing 25 by the intermediary of the plunger 27, the knives 19 being close to the bottom of the container thus mounted and therefore dip into the material 29. The spindle 15 is imparted a high speed, for example 10,000 r.p.m. or more, by the motor 23, and a smooth start without belt slip is obtained due to the large mass of the pulley 22. During rotation of the spindle 15 the oil 17 in the cylinder is spread in a thin layer along the inner side of the spindle, designated 17a, so that not only the lower ball bearing 13 but also the upper ball bearing 17 will be lubricated to the requisite extent. The material 29 in the container tends to splash up against the cover 24 during the high-speed rotation of the spindle 15, but the upwardly splashing material is efficiently stopped by the flange 28 which throws it against the wall of the container 26 down which the material flows to rejoin the other material in the container.

To prevent the spindle 15 from rotating when the container 26 is removed from the apparatus and the knives 19 are unprotected, a microswitch 30 on which the circuit of the motor 23 is dependent may be disposed on the frame 10 and arranged for actuation by an element 31 engaging the packing 25 and pressed upwards to close the switch when the container is pressed against the packing.

Making test runs with an apparatus of the construction described above and shown in the drawing for analysing sugar beets it was found that the apparatus provided an extremely fine dispersion of the mash particles, it being understood, however, that this construction can be modified within the scope of the appended claims to adapt the apparatus to the contemplated use.

What I claim and desire to secure by Letters Patent is:

1. An apparatus for dispersion of solid particles in a liquid, comprising a spindle, means mounting said spindle for rotation in a substantially vertical position, the lower end of said spindle projecting downwardly from said mounting means, a drive gear for rotating said spindle, an open-top container for material to be treated comprising solid particles in a liquid, a cover for said container supported by said mounting and traversed by said spindle which extends downwardly from the lower side of said cover, means for applying said container at its open end against the lower side of said cover with said spindle projecting into the container and having its lower end near the bottom thereof, means on said spindle at the lower end thereof for dispersing said particles in said liquid when said spindle is rotated in said container, and an annular flange on said spindle rotatable therewith, said flange being disposed beneath the lower surface of said cover.

2. An apparatus as claimed in claim 1, wherein said annular flange tapers radially towards the periphery thereof.

3. An apparatus as claimed in claim 1, in which said spindle comprises a sleeve and said mounting means comprises a stationary shaft, said sleeve being mounted for rotation thereon.

4. An apparatus as claimed in claim 3, further comprising upper and lower antifriction bearings mounting said sleeve on said shaft, said sleeve being closed at the lower end theerof to provide a space for lubricant for said bearings.

5. An apparatus as claimed in claim 1, wherein said dispersing means comprises knives having edges to comminute said particles when dispersing the same in said liquid.

References Cited
UNITED STATES PATENTS

| | | | |
|---|---|---|---|
| 2,932,494 | 4/1960 | Wales | 259—108 |
| 3,009,686 | 11/1961 | Kaplan | 259—108 |
| 3,135,500 | 6/1964 | Perrinjaquet | 146—68 |

W. GRAYDON ABERCROMBIE, *Primary Examiner.*